(12) United States Patent
Terrani et al.

(10) Patent No.: US 11,437,153 B2
(45) Date of Patent: Sep. 6, 2022

(54) 3D PRINTING OF ADDITIVE STRUCTURES FOR NUCLEAR FUELS

(71) Applicant: UT-Battelle, LLC, Oak Ridge, TN (US)

(72) Inventors: Kurt A. Terrani, Oak Ridge, TN (US); Andrew T. Nelson, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 12 days.

(21) Appl. No.: 17/097,017

(22) Filed: Nov. 13, 2020

(65) Prior Publication Data

US 2021/0158978 A1  May 27, 2021

Related U.S. Application Data

(60) Provisional application No. 62/938,567, filed on Nov. 21, 2019.

(51) Int. Cl.
| | |
|---|---|
| *G21C 3/18* | (2006.01) |
| *G21C 3/04* | (2006.01) |
| *B33Y 10/00* | (2015.01) |
| *G21C 21/02* | (2006.01) |
| *B33Y 80/00* | (2015.01) |
| *G21C 3/62* | (2006.01) |

(52) U.S. Cl.
CPC .............. *G21C 3/18* (2013.01); *B33Y 10/00* (2014.12); *B33Y 80/00* (2014.12); *G21C 3/048* (2019.01); *G21C 21/02* (2013.01); *G21C 3/623* (2013.01)

(58) Field of Classification Search
CPC .......... G21C 3/045; G21C 3/048; G21C 3/18; G21C 3/58; G21C 3/60; G21C 21/02; B33Y 10/00; B33Y 80/00
USPC ........................................ 376/412, 453, 455
See application file for complete search history.

(56) References Cited

U.S. PATENT DOCUMENTS

| | | | | |
|---|---|---|---|---|
| 2,941,933 | A * | 6/1960 | Roake | G21C 21/02 |
| | | | | 376/454 |
| 3,285,825 | A * | 11/1966 | Jens | G21C 3/18 |
| | | | | 376/412 |
| 8,654,917 | B2 * | 2/2014 | Bashkirtsev | G21C 3/28 |
| | | | | 376/454 |
| 2012/0183116 | A1 * | 7/2012 | Hollenbach | G21C 3/58 |
| | | | | 264/0.5 |
| 2017/0278586 | A1 * | 9/2017 | van Staden | C04B 35/522 |
| 2018/0151261 | A1 * | 5/2018 | Yonghee | G21C 3/045 |
| 2018/0264679 | A1 * | 9/2018 | van Rooyen | C01B 33/06 |

(Continued)

*Primary Examiner* — Jack W Keith
*Assistant Examiner* — Jinney Kil
(74) *Attorney, Agent, or Firm* — Warner Norcross + Judd LLP

(57) ABSTRACT

A method for manufacturing a nuclear fuel compact is provided. The method includes forming an additive structure, consolidating a fuel matrix around the additive structure, and thermally processing the fuel matrix to form a fuel compact in which the additive structure is encapsulated therein. The additive structure optionally includes a vertical segment and a plurality of arm segments that extend generally radially from the vertical segment for conducting heat outwardly toward an exterior of the fuel compact. In addition to improving heat transfer, the additive structure may function as burnable absorbers, and may provide fission product trapping.

11 Claims, 2 Drawing Sheets

(56) References Cited

U.S. PATENT DOCUMENTS

2018/0330832 A1* 11/2018 Enica ............... G21C 3/04
2020/0027583 A1*  1/2020 Choi ............... G21C 3/322
2020/0353681 A1* 11/2020 Fisher ............... G21C 3/60
2021/0125735 A1*  4/2021 Mariani ............ G21C 3/048

* cited by examiner

3D PRINTING OF ADDITIVE STRUCTURES FOR NUCLEAR FUELS

CROSS-REFERENCE TO RELATED APPLICATIONS

This application claims the benefit of U.S. Provisional Application 62/983,567, filed Nov. 21, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to 3D printed structures in nuclear fuels for use in nuclear power systems and other applications.

BACKGROUND OF THE INVENTION

There exists a variety of fuels for nuclear reactors. For example, uranium dioxide is a widely used nuclear fuel having a favorably high melting point and being inert in air and water. Mixed oxide fuels are a further class of nuclear fuels that contain a blend of plutonium and natural or depleted uranium that behave similarly to uranium dioxide-based fuels. To form these fuels, constituent powders are typically granulated and cold pressed followed by high temperature sintering to obtain high density pellets. These high density pellets are loaded into zircaloy fuel cladding tubes, forming fuel rods, which are grouped into fuel assemblies that make up the core of a nuclear reactor.

In these and certain other nuclear fuels, thermal conductivity is very low and is inversely related to temperature. Because of the low thermal conductivity of uranium dioxide for example, there exists a high temperature gradient and a very high centerline temperature during fuel operation in the nuclear reactor, which can result in thermal stresses, cracking, and fission gas release. Over time in the high-radiation environment, high-density uranium dioxide pellets experiencing high temperatures can swell and detrimentally interact with the cladding tubes, resulting in failure of the cladding. Excessive fission gas release due to high temperatures reduces heat transfer to the cladding and causes the rod internal pressure to increase, further subjecting the cladding to high mechanical stress.

It is known to incorporate additives into uranium dioxide pellets to improve heat transfer. Additives are typically included as fine powders and are chemically mixed with the fuel feedstock. As a result, additives are uniformly dispersed within the nuclear fuel pellet. It is also known to cap the upper and lower flat surfaces of each fuel pellet. However, these techniques leave unresolved the need to more uniformly disperse heat from within each nuclear fuel pellet. Accordingly, there remains a continued need for methods for the manufacture of nuclear fuels, including uranium oxide fuels, for use in nuclear power systems and other applications.

SUMMARY OF THE INVENTION

A method for manufacturing a nuclear fuel compact is provided. The method includes forming an additive structure, consolidating a fuel matrix around the additive structure, and thermally processing the fuel matrix to form a densified nuclear fuel compact. The additive structure is encapsulated within the fuel matrix and optionally includes multiple arm segments that extend generally radially for conducting heat outwardly toward an exterior surface of the nuclear fuel compact. In addition to improving heat transfer, the additive structure may function as burnable absorbers and may provide fission product trapping.

In one embodiment, forming the additive structure can include powder bed fusion, direct energy deposition, lithography-based processes, or binderjet printing, for example. Once formed, the additive structure is incorporated into the fuel matrix. In one embodiment, the additive structure is placed inside a mold cavity and the fuel matrix is formed around it, optionally by gel-casting fuel precursors. In another embodiment, the additive structure is placed inside a die and the fuel matrix (in powder form) is punch set for cold or hot pressing. In still another embodiment, a fuel feedstock (or fuel precursor) powder or slurry is packed around the additive structure for further processing infiltration. A variety of thermal processes may be used to realize a robust and dense fuel compact having a fuel matrix and an internal additive structure. Thermal processes can include sintering, hot-pressing (including direct current, spark plasma, field assisted, etc.), or infiltration (e.g., liquid wicking or chemical vapor infiltration) of the structural material.

The ability to include fuel additives as a three-dimensional structure offers benefits over their uniform dispersion and dissolution in conventional fuel pellets. For instance, continuous additive structures of high thermal conductivity are far superior in conducting heat away from the fuel center when compared to their additions as uniformly dispersed particles. In a similar fashion, strategically placing burnable absorbers in nuclear fuel can allow their most efficient utilization without displacing fuel in a non-optimal fashion.

These and other features of the invention will be more fully understood and appreciated by reference to the description of the embodiments and the drawings. Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

As discussed herein, the current embodiments relate to a method for the manufacture of a nuclear fuel compact. The method includes incorporating an additive structure within a fuel matrix for enhancing one or more properties of the resulting nuclear fuel compact. More specifically, and with reference to FIG. 1, the method generally includes the steps of forming an additive structure (step 1), consolidating a fuel matrix around the additive structure (step 2), and thermally processing the fuel matrix to form a densified nuclear fuel compact (step 3). Each step is separately discussed below.

Forming an additive structure includes any process in which a three-dimensional build is formed in successive layers according to one or more additive manufacturing techniques. Suitable additive manufacturing techniques include, by non-limiting example, binderjet printing, powder bed fusion, direct energy deposition, and lithography processes. In binderjet printing, for example, a powder feedstock is deposited in sequential layers, one on top of the other. Following the deposit of each layer of powder feedstock, a liquid binder material, for example a polymeric binder, is selectively supplied to the layer of powder feedstock in accordance with a computer model (e.g., CAD model) of the additive structure. Any excess powder is removed from the three-dimensional build, and the three-dimensional build is then subject to thermal sintering whereby any residual volatile solvents are removed.

The additive structure may be formed according to other processes, whether now known or hereinafter developed. In powder bed fusion, for example, a laser beam scans select locations of a powder bed to fuse the powder feedstock to the solid material underneath either by full melting (selective laser melting) or partial melting (selective laser sintering). The powder bed is then lowered and a new layer of powder feedstock is dropped and leveled. This process repeats itself until the additive structure is completely built, during which time the build chamber is protected by a flow of inert gas, for example argon or nitrogen, to prevent oxidation. In another example, the additive structure is formed according to direct energy deposition, which involves the simultaneous introduction of the additive material and the energy source. The additive material is fed in the form of a powder or as a filament, and upon interaction with the energy source, the additive material melts almost instantly, creating a melt pool that solidifies rapidly as the energy source moves away. This process repeats itself until the additive structure is completed.

Figure 2:
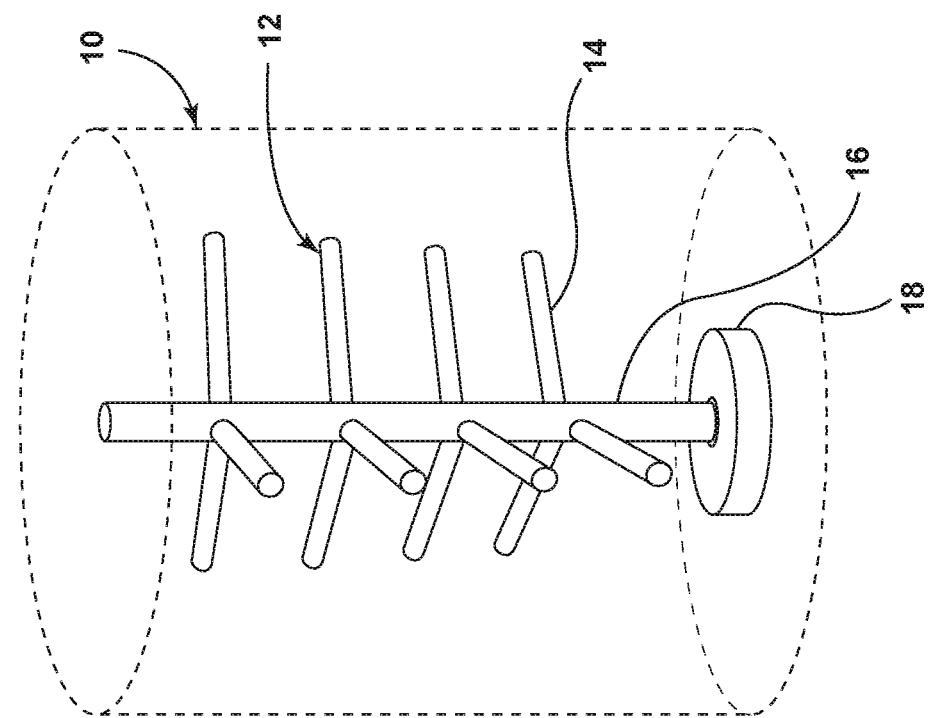
FIG. 2 is a perspective view of a nuclear fuel compact including an internal additive structure.

These and other additive manufacturing processes are used to form the additive structure, which can comprise essentially any three-dimensional geometry, including geometries having overhangs, undercuts, and internal volumes. As shown in FIG. 2 for example, a fuel compact 10 includes an additive structure 12 having a plurality of arm segments 14 that extend generally radially from a vertical segment 16. The vertical segment 16 optionally includes a base 18 as part of the three-dimensional build. The arm segments 14 are approximately orthogonal to the vertical segment 16, with three columns of four arm segments being illustrated. This geometry is well suited to draw heat away from the interior of a nuclear fuel compact 10, toward the exterior sidewall, but can be modified in other embodiments as desired. In addition, the material composition can be selected to enhance one or more properties of the resulting nuclear fuel compact. For example, the additive structure can be formed from a non-fuel matrix material having a high melting point and good thermal conductivity. To improve the thermal conductivity of the fuel compact, the additive structure can include molybdenum, further optionally any material having a thermal conductivity of great than 10 W/mK. Other materials can be selected for low neutron capture and fission product trapping.

Figure 1:
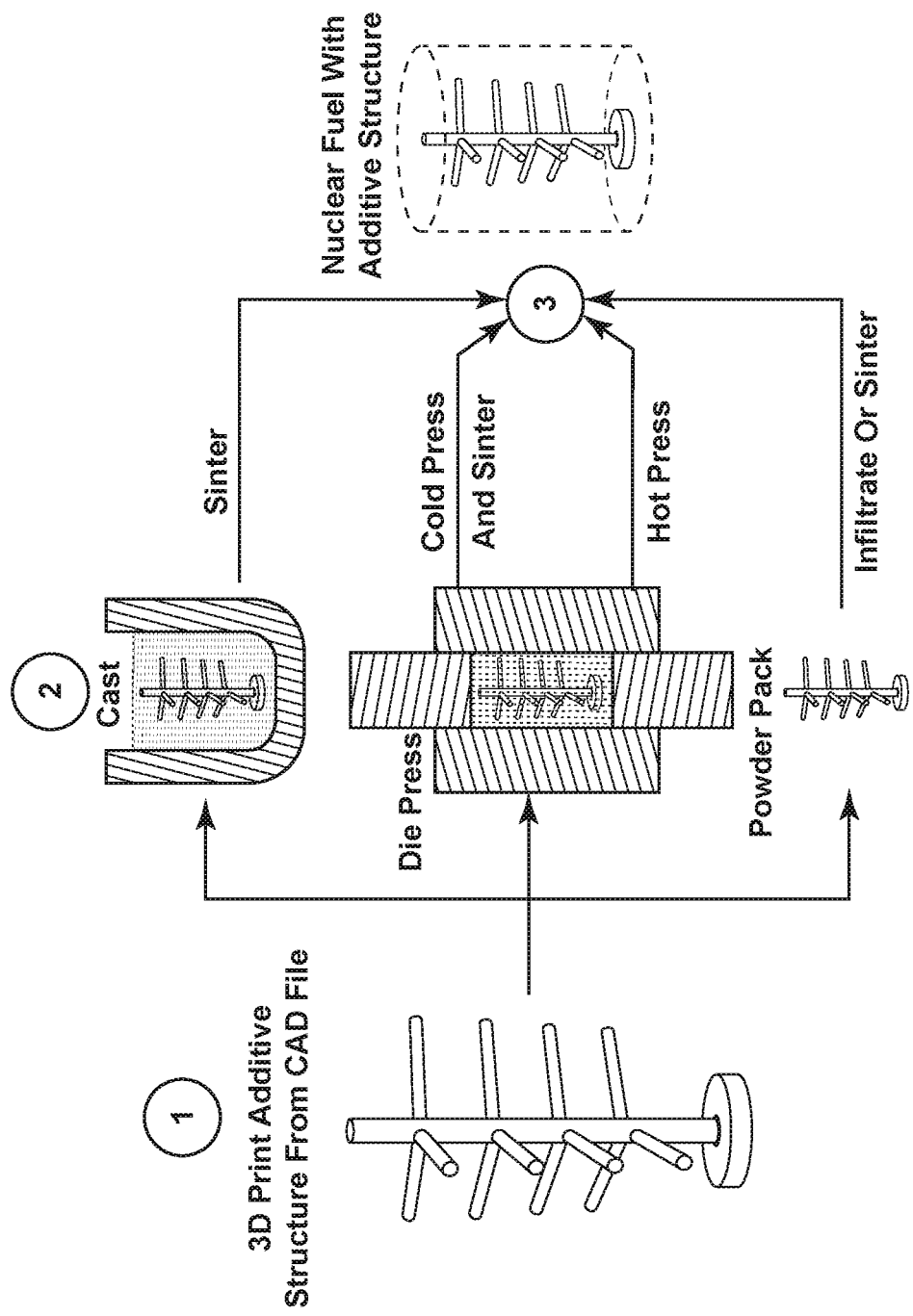
FIG. 1 is a schematic diagram of multiple processes for consolidating a fuel matrix around an additive structure in advance of thermal processing.

As a second step in forming a nuclear fuel compact, consolidating a fuel matrix around the additive structure includes any process in which a fuel matrix is applied to the exterior of the additive structure. The fuel matrix generally includes a fuel feedstock containing a fissionable isotope oxide, for example uranium dioxide or plutonium dioxide. As shown in FIG. 1, suitable processes include casting the fuel matrix around the additive structure within a mold cavity, optionally by gel-casting the fuel precursor. Other processes include placing the additive structure within a die and either hot pressing or cold pressing a powder feedstock about the additive structure. Still other processes include packing a fuel feedstock (or fuel precursor) powder or slurry around the additive structure. The fuel matrix can include essentially any volume in which the additive structure is partially or entirely encapsulated by the fuel matrix, including for example a cylindrical shape common for uranium dioxide fuel pellets.

As a third step in forming a nuclear fuel compact, the fuel matrix is subject to thermal processing in accordance with technical requirements for a given fuel matrix. Thermal processing can include, for example, sintering a gel cast uranium dioxide fuel matrix in a furnace that is heated to 1700° C. for up to 24 hours in an inert environment. Further by example, thermal processing can include sintering a consolidated powder feedstock after cold pressing. Still further by example, thermal processing can include hot pressing operations, including direct current, spark plasma, or field assisted hot pressing. As also shown in FIG. 1, other thermal processing techniques include infiltration, for example liquid wicking or chemical vapor infiltration of the structural material.

The method of the present invention provides a scalable process for the production of nuclear fuel compacts having internal additive structures that enhance one or more properties of the nuclear fuel compact. The resulting nuclear fuel compact can include an additive structure that is less than 30% by volume of the nuclear fuel compact, further optionally less than 20% by volume of the nuclear fuel compact.

To reiterate, the present method provides fuel additives as a three-dimensional structure, which offers benefits over their uniform dispersion and dissolution. For instance, continuous additive structures of a high thermal conductivity are far superior in conducting heat away from the fuel center when compared to their additions as uniformly dispersed particles. The continuous additive structure may optionally include multiple arm segments that extend generally radially from a vertical segment for conducting heat outwardly toward an exterior of the fuel compact. In addition to improving heat transfer, the additive structure may function as burnable absorbers, and may provide fission product trapping. Multiple nuclear fuel compacts can be loaded into fuel cladding tubes, forming fuel rods, and grouped into fuel assemblies that make up the core of a nuclear reactor.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of manufacturing a nuclear fuel compact comprising:
   forming an additive structure, by:
      forming successive layers of a base of the additive structure,
      forming successive layers of a vertical segment of the additive structure extending upwardly from the base, wherein the vertical segment has a width less than a width of the base, and
      concurrently forming successive layers of:
         arm segments of the additive structure joined to the vertical segment, and
         corresponding portions of the vertical segment, wherein the arm segments comprise cantilevered beams extending orthogonally from the vertical segment at spaced apart intervals along a height of the vertical segment;
   consolidating a fuel matrix around the additive structure into a cylindrical pellet, wherein the vertical segment of the additive structure is disposed axially within an interior region of the cylindrical pellet and the arm segments of the additive structure extend radially from the interior region to an exterior region of the cylindrical pellet; and
   thermally processing the cylindrical pellet to form a densified nuclear fuel compact in which the additive structure is encapsulated by the fuel matrix,
   wherein the additive structure includes molybdenum and the cylindrical pellet includes a fissionable isotope oxide, such that the molybdenum additive structure transfers heat from the interior region toward the exterior region via the plurality of arm segments.

2. The method of claim 1 wherein forming the additive structure includes forming successive layers of the additive structure according to a computer model thereof.

3. The method of claim 1 wherein forming the additive structure includes depositing a binder onto successive layers of a powder feedstock via binderjet printing.

4. The method of claim 1 wherein forming the additive structure includes fusing successive layers together according to a powder bed fusion process.

5. The method of claim 1 wherein forming the additive structure includes depositing successive layers of the additive structure according to a direct energy deposition process.

6. The method of claim 1 wherein consolidating the fuel matrix includes casting the fuel matrix around the additive structure within a mold cavity.

7. The method of claim 1 wherein consolidating the fuel matrix includes punch setting the fuel matrix about the additive structure within a die cavity.

8. The method of claim 1 wherein consolidating the fuel matrix includes packing a fuel feedstock or fuel precursor around the additive structure.

9. The method of claim 1 wherein thermally processing the fuel matrix includes sintering the fuel matrix to form the densified nuclear fuel compact.

10. The method of claim 1 wherein thermal processing the fuel matrix includes hot-pressing the fuel matrix to form the densified nuclear fuel compact.

11. The method of claim 1 wherein thermal processing the fuel matrix includes chemical vapor infiltration of the structural material to form the densified nuclear fuel compact.

\* \* \* \* \*